United States Patent [19]

Keller

[11] Patent Number: 5,259,707
[45] Date of Patent: Nov. 9, 1993

[54] SPOT DRILL WITH INDEXABLE REPLACEABLE INSERT

[76] Inventor: Dale L. Keller, 1045 Storm's Store Rd., Gettysburg, Pa. 17325

[21] Appl. No.: 930,897

[22] Filed: Aug. 17, 1992

[51] Int. Cl.$^5$ ............................................. B23B 51/00
[52] U.S. Cl. ..................... 408/233; 407/40; 407/54; 407/113; 408/231; 408/713
[58] Field of Search .............. 408/233, 713, 227, 228, 408/231, 232, 223, 224, 199; 407/40, 54, 113, 114

[56] References Cited

U.S. PATENT DOCUMENTS

| | | | |
|---|---|---|---|
| 2,575,239 | 11/1951 | Stephens | 408/233 X |
| 3,878,905 | 4/1975 | Schaumann | 408/713 X |
| 4,047,826 | 9/1977 | Bennett | 408/59 |
| 4,060,335 | 11/1977 | Holloway et al. | 408/233 |
| 4,197,042 | 4/1980 | Krhounek et al. | 408/200 |
| 4,293,254 | 10/1981 | Markovics | 408/229 |
| 4,493,596 | 1/1985 | Grunsky et al. | 408/713 X |
| 4,505,626 | 3/1985 | Benhase | 408/224 |
| 4,527,931 | 7/1985 | Sarin | 407/113 |
| 4,591,302 | 5/1986 | Loevdahl | 408/188 |

FOREIGN PATENT DOCUMENTS 2056091 10/1971 Fed. Rep. of Germany.

*Primary Examiner*—Steven C. Bishop
*Attorney, Agent, or Firm*—Nies, Kurz, Bergert & Tamburro

[57] ABSTRACT

A spot drilling and centering drill including a body having a cylindrical head portion and a replaceable indexable insert mounted in the head portion. A V-angled slot is formed directly in the head portion. The insert has two V-angled cutting surfaces with a drill point, each cutting surface fitting within the V-angled slot to locate the drill points on the centerline of rotation of the drill.

11 Claims, 1 Drawing Sheet

U.S. Patent     Nov. 9, 1993     5,259,707
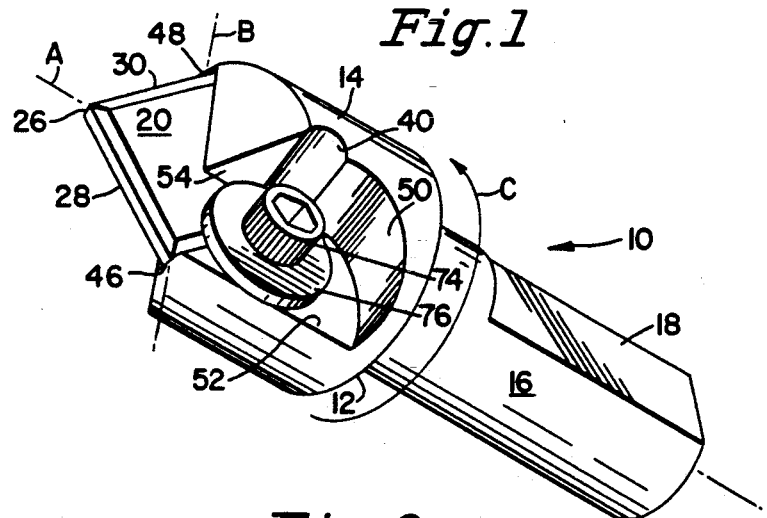
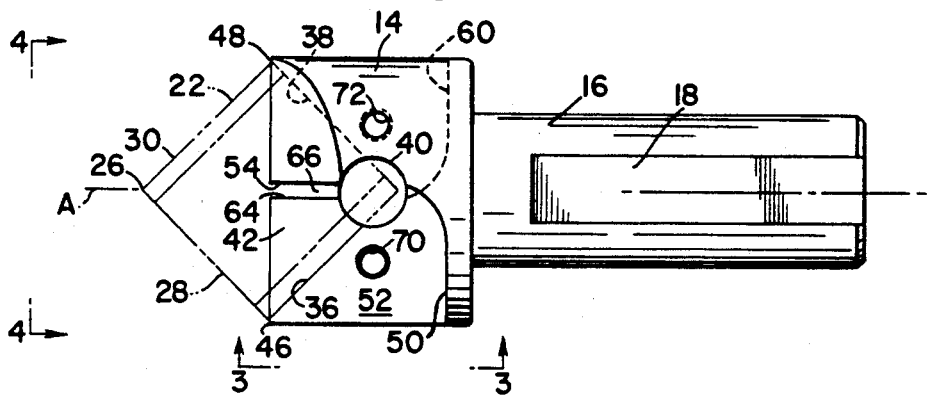
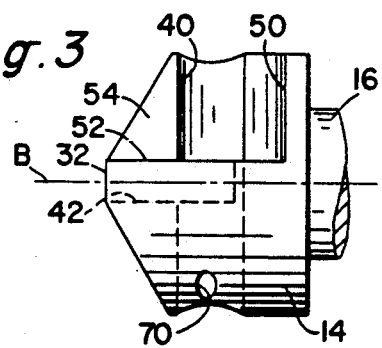
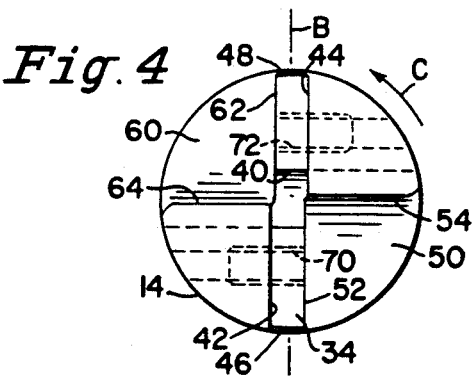
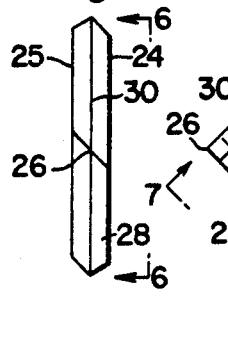
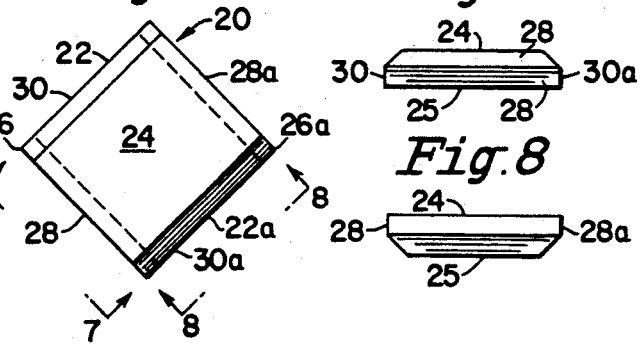
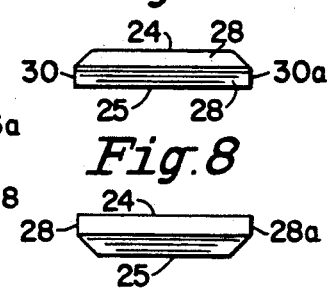
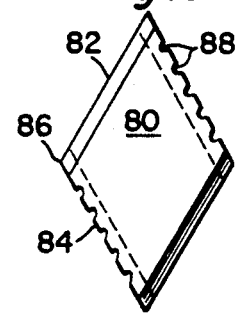

SPOT DRILL WITH INDEXABLE REPLACEABLE INSERT

BACKGROUND OF THE INVENTION

This invention relates generally to spot drilling and countersink tools and more particularly to a novel combined spot drill and countersink tool having a replaceable indexable insert.

In metal working applications spotting and centering drills are used to very accurately locate holes within close tolerances, for example within 0.000 to 0.002 inches of true centerline position on CNC and similar drilling machines. The spot drills provide a true center position from which longer twist drills may locate and thereafter drill deep straight holes in all types of materials. In the past spotting and centering drills have been made of one piece from high speed steel material or solid carbide material and drill point angles and flutes are ground in one end of the material as required.

Such conventional spotting and centering drills are disadvantageous in several respects. First, the drill point must be reground periodically and this requires removal of the drill from its holder. When the spot drill is reinserted into its holder after sharpening, the position of the drill and/or its holder must be reset lengthwise to ensure that a spot of proper depth is attained. Second, because of the high cost of the solid carbide drills the high speed steel spot drills are more commonly used, but these have severe limitations as to the speed at which they are capable of spot drilling. Thus, quite often the high speed steel spot drills are used to save cost but at a substantial sacrifice in drilling speed.

Conventional countersink and deburring tools are used to debur, chamfer and/or countersink the outermost ends of already drilled holes on a face of a part and thereby provide an angled surface of 60, 82 or 90 degrees of desired depth. The angled surface may simply serve to debur the edge, provide a thread chamfer, or be deep enough to receive the head of a bolt. Countersink and deburring tools have traditionally been made of one piece material but in more recent years have been provided with indexable replaceable inserts by which the already formed hole is enlarged. Prior U.S. Pat. Nos. 4,197,042, 4,293,254, 4,505,626 and 4,591,302 illustrate countersinking tools having removable inserts.

However, existing countersink tools, whether they be of the one piece solid material type or of the type having replaceable inserts, will not spot drill to provide an accurate center point for a subsequent drilling operation. The countersink tools can only enlarge the diameter of an already formed hole.

It has also been proposed to provide other type drills with replaceable inserts, for example, the spade drills illustrated in U.S. Pat. Nos. 4,047,826, 4,060,335 and German Pat. DE 2056091. However drills of this type are not capable of spot drilling or spot facing within the tolerances normally required for such an operation, but are usually employed in rough drilling deep holes where accuracy is not required. Similarly U.S. Pat. No. 4,527,931 illustrates a mining drill having a replaceable insert used for drilling coal mine bolt holes, another application in which accuracy is not important.

SUMMARY OF THE INVENTION

Accordingly, the primary object of this invention is to provide a novel spotting and centering drill tool comprising a support head and a removable insert which is automatically located and set within the support head so as to spot drill the face of a workpiece within extremely close tolerances.

Another object of the invention resides in the provision of the above novel spot drill tool in which the insert has two cutting surfaces for spot drilling, the insert being indexable from one cutting surface to the other without requiring removal of the tool from its holder and without necessitating resetting of the tool with respect to the workpiece to ensure that the depth of the spot drilled hole remains the same.

Another object of this invention is to provide the above novel spot and centering tool formed of a one-piece solid body having a drive shank and an enlarged support head in which a V-shaped support surface is integrally formed with extreme accuracy on the centerline of rotation of the shank and head. The insert has two corresponding V-shaped cutting surfaces which mate with the V-shape support surface to ensure that the drill point of each of the cutting surfaces is automatically aligned on the centerline of rotation of the tool.

A further object of the invention is to provide the above spotting and centering drill wherein the head includes clamping surfaces which extend parallel to a radius line on the head on each side of the centerline of rotation of the tool. The insert is accurately and firmly clamped in place against the clamping surfaces without creating any distortion or shifting of the head. As a result, during the spot drilling operation the pressure on each side of the centerline of the cutting surface is equal and the spot drill may be operated at a very high speed of rotation without experiencing vibration or run out, thus affording a substantially higher feed rate of surface feet per minute than is possible with conventional high speed steel spot drill tools.

Still another object of the invention is to provide the above novel spotting and centering drill which may also be used to very accurately chamfer, countersink, or debur existing holes on the face of a workpiece.

Another object of the invention is to provide an insert of novel construction and design for use with the above spot drill tool. The insert cooperates with the support head to effect accurate, close tolerance spot drilling, countersinking, chamfering, and/or deburring operations at high rates of speed and feed desirable on modern CNC machining equipment.

Other objects and advantages will become apparent from reading the following detailed description of the invention wherein reference is made to the accompanying drawings in which like numerals indicate like elements.

BRIEF DESCRIPTION OF THE DRAWINGS

FIG. 1 is a generally perspective view of the novel spotting and centering drill tool of the invention;

FIG. 2 is a side elevation view of the tool of FIG. 1 arranged in a horizontal position with the insert shown in phantom;

FIG. 3 is a partial fragmentary view of the support head of the tool taken generally along line 3—3 of FIG. 2;

FIG. 4 is an end view of the support head taken along line 4—4 of FIG. 2;

FIG. 5 is an end view of the cutting insert as viewed generally along line 4—4 of FIG. 2;

FIG. 6 is a right side view of the insert taken along lines 6—6 of FIG. 5;

FIG. 7 is an edge view taken along line 7—7 of FIG. 6;

FIG. 8 is an edge view taken along line 8—8 of FIG. 6;

FIG. 9 is a view similar to FIG. 6 illustrating another insert of a different configuration which may be used with the tool of the invention.

DETAILED DESCRIPTION OF THE INVENTION

The novel spotting and centering drill tool 10 of the invention includes a one piece steel body 12 having an enlarged cylindrical head portion 14 concentric with a reduced diameter shank portion 16 about a center line or axis of rotation A. The shank has a flat 18 and is insertable into a suitable tool holder mounted within a rotating machine spindle which rotates tool 10 in a direction C (FIGS. 1 and 4). Head 14 is appropriately machined to receive and support a carbide drill insert 20 by which a V-shaped spotting and centering hole is drilled on the face of a workpiece or by which already formed holes may be deburred, chamfered, or countersunk as will be described hereinafter.

The insert 20 is a square carbide insert having two V-shaped cutting surfaces 22 and 22a each formed respectively with a drill point 26 and 26a located on the centerline A of body 12 and cutting edges 28, 28a, and 30, 30a which diverge from chisel point 26, 26a respectively at an angle of 90° with respect to each other. Insert 20 also has parallel side surfaces 24 and 25.

Cylindrical head 14 includes an end face 32 which is machined perpendicular to the centerline A of body 12. A V-shaped diametral slot 34 is machined directly into head 14 from end face 32 on a diametral plane B intersecting centerline A to provide edge support surfaces 36 and 38 angled with respect to each other at the same angle existing between cutting edges 28 and 30. Angled slot 34 is centered on the axial centerline A of body 12 within very tight tolerances, e.g. within no more than 0.001 to 0.002 inches. Slot 34 has a width equal to the thickness of insert 20, plus 0.001 inches clearance. An enlarged opening 40 is drilled through head 14 at the base of the point of intersection of surfaces 36 and 38 in a direction perpendicular to the diametral plane B of slot 34. As shown in FIG. 2 hole 40 provides clearance for the drill point 26 or 26a of the insert cutting surface which is not in use.

As viewed in FIGS. 1 and 2, on the left side of the axial centerline A of head 14, slot 34 is defined by a backing surface 42 which extends parallel to and on one side of the diametral plane B. On the right side of centerline A slot 34 is defined by backing surface 44 which extends parallel to but on the other side of diametral plane B. Insert 20 is rigidly clamped against surface 42 and 44 when fastened into head 14.

The depth of slot 34 from end face 32 into head 14 corresponds to half the diagonal distance between drill points 26 and 26a and the external diameter of cylindrical head 14 is sufficiently large so that the slot 34 at end face 32 does not break through the outer diameter of head 14 but rather terminates at solid wall segments 46 and 48. Consequently the cutting surface 22 or 22a which is mounted within slot 34 is fully supported within the head during use.

In order to firmly clamp insert 20 within slot 34, a recessed cavity 50 is machined into head 14 along a direction perpendicular to plane B on the left side of centerline A to provide a flat clamp face 52 which is parallel to the backing surface 42 of slot 34. The interior face 54 of cavity 50 is perpendicular to plane B, intersects opening 40, and extends to the right or top (FIG. 2) slightly beyond the centerline A.

Similarly on the other side of head 14 a cavity 60 is machined identically to cavity 50 but in the opposite direction, to provide a flat clamp face 62 which is parallel to the backing surface 44, and a face 64 which intersects hole 40 and extends beyond the centerline A. Because of the way cavities 50 and 60 are machined in head 14, with the insert removed from head 14 one can see daylight at 66 through slot 34 because the planes in which faces 54 and 64 lie are spaced from each other.

Drilled and tapped holes 70 and 72 are furnished in faces 52 and 62, respectively, and each receives a cap screw 74 which tightens a clamp ring 76 against faces 52 and 62 and the adjacent side surfaces of insert 20.

During use, cavities 50 and 60 provide chip clearance for material removed cutting surface 22 or 22a. In addition end face 32 is machined backwardly at an angle from backing surfaces 42 and 44 to provide chip clearance sections 77 and 78 adjacent the trailing sides of insert 20.

As noted above slot 34 is cut exactly on the diametral centerline B of head 14 and has a width of approximately 0.001 inches greater than the thickness of insert 20. Consequently backing surfaces 42 and 44 are spaced a distance from the centerline B half the thickness of insert 20. However, in machining the cavities 50 and 60 the faces 52 and 62 are finished at a distance from the centerline B less than half the thickness of the insert, e.g. 0.010 inches less. As a result the clamp rings 76 are provided with about a 0.010 inch pinch fit against the side surfaces of insert 20 when cap screws 74 are tightened down. This assures that the insert is clamped firmly in place between the rings 76 and the backing surfaces 42 and 44.

It is apparent from the above that the indexable insert is firmly secured within head 14 during use of the tool. As shown in FIGS. 1 and 2, the V-shaped cutting surface 22a which is not being used firmly seats within the V angled slot 34 with its edges 28a and 30a fully engaged against support surfaces 36 and 38 and its side surfaces 25 and 24 butting against backing surfaces 42 and 44 in the head. The drill point 26a which is nested within head 14 locates within clearance opening 40 so that it does not interfere with proper seating of edges 28a and 30a against surfaces 36 and 38. As clamp rings 76 are tightened against insert 20 and faces 52 and 62, there is no movement of any part of head 14 which may cause the insert 20 to shift off the centerline of the head. Consequently insert 20 and drill point 26 are firmly clamped in place and remain on the centerline A of the tool within the machined tolerances of V-slot 34, i.e. within 0.001 to 0.002 inches. During operation as tool 10 rotates in the direction of arrow C (FIGS. 1 and 4) this ensures that there is equal pressure on the cutting edges 28 and 30 on each side of the centerline A of drill point 26. This allows the drill to be run at a very high speed without vibrating and without requiring any radial support while cutting. Consequently the centering hole which is spotted on the face of the workpiece is on line with centerline A. Similarly any chamfer or countersinking enlargement of an already drilled hole is directly on centerline with that hole.

The tool 10 and insert 20 illustrated in FIGS. 1-8 are shown at approximately full size, with the insert being square and having its edges 28 and 30 from corner to corner (FIGS. 6 and 7) at a dimension of 1.250 inches ±0.001.

The square insert 20 is 0.250 inches ±0.001 thick and the V-shaped cutting surface 22 is formed by cutting edges 28 and 30 which intersect at drill point 26, while the other V-shaped cutting surface 22a is formed by cutting edges 28a and 30a which intersect at drill point 26 and 26a. The insert has parallel side faces 24 and 25. As shown in FIGS. 5-8 the leading portions of edges 30 and 30a are perpendicular to side face 25 while the trailing portions are ground at a relief angle of 45° with respect to the trailing portions and with respect to face 24. Similarly the leading portions of opposed edges 28 and 28a are perpendicular to side face 24 while the trailing portions are ground at a 45° angle with respect to the leading portions and with respect to face 25.

Grinding the 45° flats on the trailing portions of cutting edges 28, 30, 28a and 30a thins the chisel or drill point 26a to a desired size and reduces the thrust required during a drilling operation. The 45° flats provide a relief on the trailing edge and give cutting edge clearance. The 45° grind also leaves the leading portion of the cutting edge neutral which has clearance for cutting but it also provides a close relief guide to produce chatterless drilling and countersinking. This prevents the insert from diving into the cut and breaking.

The insert may be shaped other than square. For example as shown in FIG. 9 an insert 80 may be trapezoidal with cutting edges 82 and 84 intersecting at an angle of 120° to form the drill point 86. In this case the V angle formed by mounting surfaces 36 and 38 in head 14 would be machined at a corresponding angle. Also the cutting edges may be provided with chip splitter grooves 88 ground or molded into the leading portions of the cutting edges.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A spot drilling tool comprising a head portion and a shank portion concentric with each other about a centerline of rotation, a cutting insert removably mounted within said head portion and having a V-shaped cutting surface with a drill point and a V-shaped support surface, a V-shaped slot formed directly in said head portion along a diametral plane intersecting said centerline of rotation, first and second cavity means formed in said head on opposite sides of said centerline and extending in a direction substantially perpendicular to said diametral plane, each cavity means having a clamp face which extends generally parallel to said slot, said V-shaped support surface of said insert fitting within said V-shaped slot to locate said drill point on said centerline, and clamp means mounted within each of said cavity means and engaging against said clamp face and said insert to hold said insert in said head portion.

2. The spot drilling tool of claim 1, said slot being defined by a backing surface on each side of said centerline, each said clamp means locking said insert, against a respective backing surface.

3. The spot drilling tool of claim 2, wherein the distance from said diametral plane to said clamp face is less than one-half the thickness of said insert, said clamp means including a clamp element fastened to said clamp face and pinching against said insert.

4. The spot drilling tool of claim 1, said head portion being cylindrical and of a sufficiently large diameter so that said slot terminates at solid wall segments at the end of the head portion, the V-shaped support surface thereby being fully supported within said slot.

5. The spot drilling tool of claim 1, said V-shaped support surface being a second V-shaped cutting surface with a drill point, said insert being indexable and mountable within said head portion to permit use of either the first or second cutting surfaces.

6. The spot drilling tool of claim 5, wherein each of the V-shaped cutting surfaces includes two cutting edges diverging from the drill point, the trailing portion of each of the cutting edges being formed with a relief angle to provide clearance during a cutting operation.

7. A spot drilling tool comprising a cylindrical head portion and a cylindrical shank portion concentric with each other about a centerline of rotation, an indexable cutting insert removably mounted within said head portion and having a pair of V-shaped cutting surfaces formed with a drill point, a V-shaped slot formed directly in said head portion along a diametral plane intersecting said centerline of rotation, said slot being defined by a backing surface on each side of said centerline, first and second cavity means formed in said head on opposite sides of said centerline and extending in a direction substantially perpendicular to said diametral plane, each cavity means having a clamp face which extends generally parallel to said backing surface, one of said V-shaped cutting surfaces fitting within said V-shaped slot to locate said drill points on said centerline, and clamp means mounted within each of said cavity means and engaging against said clamp face and said insert to lock said insert against a respective backing surface.

8. The spot drilling tool of claim 7, wherein the distance from said diametral plane to said clamp face is less than one-half the thickness of said insert, said clamp means including a clamp element fastened to said clamp face and pinching against said insert.

9. The spot drilling tool of claim 8, said head portion being of a sufficiently large diameter so that said slot terminates at solid wall segments at the end of the head portion, the one V-shaped cutting surface thereby being fully supported within said slot.

10. The spot drilling tool of claim 7, wherein each of the V-shaped cutting surfaces includes two cutting edges diverging from the drill point, the trailing portion of each of the cutting edges being formed with a relief angle to provide clearance during a cutting operation.

11. A cutting insert for a drilling tool comprising a body having parallel side faces, a pair of V-shaped cutting surfaces extending between said side surfaces and each including a pair of cutting edges diverging from a center drill point, the leading portion of each of said cutting edges being substantially perpendicular to an adjacent one of said side surfaces and the trailing portion of each of said cutting edges being angled with respect to the adjacent other of said side surfaces.

* * * * *